United States Patent [19]

Kahn et al.

[11] Patent Number: 4,606,042
[45] Date of Patent: Aug. 12, 1986

[54] METHOD FOR DIGITAL TRANSMISSION OF MESSAGES

[75] Inventors: Klaus-Dieter Kahn, Germering; Friedrich Kuehne; Hermann Barth, both of Munich, all of Fed. Rep. of Germany

[73] Assignee: Siemens Aktiengesellschaft, Berlin and Munich, Fed. Rep. of Germany

[21] Appl. No.: 538,296

[22] Filed: Oct. 3, 1983

[30] Foreign Application Priority Data

Oct. 21, 1982 [DE] Fed. Rep. of Germany ....... 3238973

[51] Int. Cl.$^4$ ............................................. H04L 9/00
[52] U.S. Cl. .................... 375/2.1; 178/22.09; 178/22.15; 178/22.17
[58] Field of Search ............... 178/22.13, 22.14, 22.15, 178/22.16, 22.19, 22.17; 375/2.1; 455/26, 30, 70; 370/43, 82, 83, 105, 100, 99

[56] References Cited

U.S. PATENT DOCUMENTS

| | | | |
|---|---|---|---|
| 3,127,475 | 3/1964 | Coulter | 370/100 |
| 3,798,378 | 3/1974 | Epstein | 370/105 |
| 4,369,443 | 1/1983 | Giallanza et al. | 455/70 |
| 4,434,323 | 2/1984 | Levine et al. | 178/22.14 |

FOREIGN PATENT DOCUMENTS

| | | | |
|---|---|---|---|
| 0067977 | 12/1982 | European Pat. Off. | 375/2.1 |
| 2943115 | 5/1981 | Fed. Rep. of Germany | 375/2.1 |

OTHER PUBLICATIONS

DRS 34/1900-A Digital Radio Relay System for Signal Transmission at 34 Mbit/s, reprint from "telcom report", 6 (1983) No. 1, pp. 7-12, Authors: Hans-Otto Simon and Wolfgang Ulmer.

*Primary Examiner*—Salvatore Cangialosi
*Assistant Examiner*—Aaron J. Lewis
*Attorney, Agent, or Firm*—Thomas H. Jackson

[57] ABSTRACT

The invention involves a method for digital transmission of messages in a digital radio relay system which utilizes a superframe so additional information can be transmitted with a digital signal. This method eliminates the simulation of a frame alignment signal by service bits. In this invention m superframes each consisting of two half-frames containing a byte for additional bits and in which a scrambling of the digital signals takes place by adding a periodic bit pattern to the digital signal, are combined to form a multiple frame. The pattern used for scrambling has a period equal to the length of the multiple frame.

7 Claims, 1 Drawing Figure

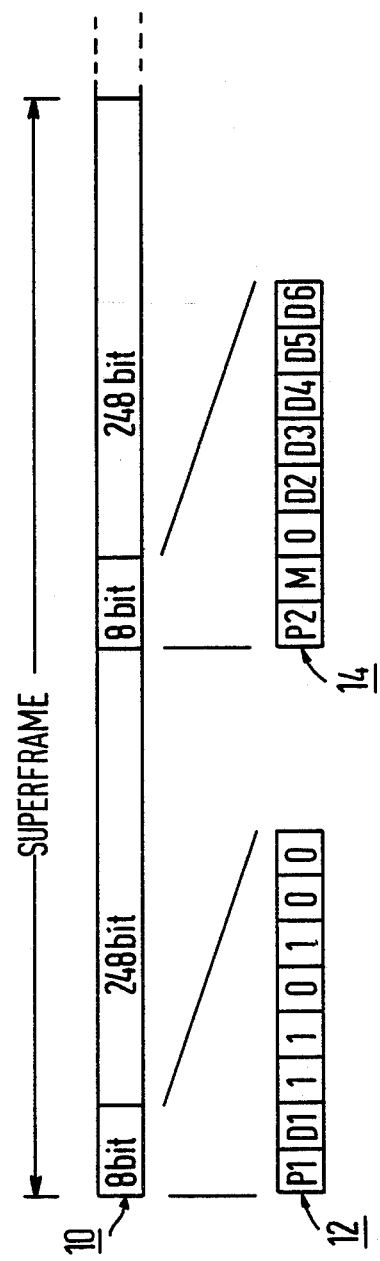

METHOD FOR DIGITAL TRANSMISSION OF MESSAGES

BACKGROUND OF THE INVENTION

The invention relates to a method for digital transmission of messages in a digital radio relay system which utilizes a superframe, so that additional information can be transmitted with the digital signals.

In a digital radio realy system which has two terminals and one or more repeater stations, additional bits are inserted into the digital signal which is transmitted from the transmitting terminal. These additonal bits are then removed at the receiving terminal. These additional bits consist of frame alignment bits, parity bits and service bits, which are arranged according to the superframe used. They can be arranged either in individual bits or in bytes. The frame alignment bit enables the receivers in the repeater terminals to synchronize themselves with the superframe and to evaluate parity and service bits. The parity bits monitor the transmission quality. The service bits transmit alarm messsages, the RF channel code, and the digital service signals for service calls, long distance monitoring and switching commands.

A scrambling of the digital signals is connected with the superframe. In the transmitter a periodic bit pattern is generated synchronous to the superframe and added to the digital signal so that a scrambled digital signal is generated. In the receiver the same scrambler sequence is generated and added to the scrambled digital signal so the original digital signal is retrieved. In both cases the addition is carried out as a modulo-2-addition (binary addition). The generator for the scrambler sequence is usually a feedback shift-register which is reset periodically, such as at the beginning of the superframe.

A method for inserting additional bits into a superframe is described in the TELCOM Report 5 (1982) 2, at pages 138–144. In this method the superframe contains two bytes, with each byte having k additional bits between which l information bits are located. However, in this method, the possibility exists that a frame alignment signal can be simulated by service bits in the second byte. Also, during the transmission of periodic patterns whose period divisors are 2:1, the frame alignment signal can be simulated at any location in the superframe. However, by eliminating these simulations the parameter selection of the superframe and the scrambling are reduced.

SUMMARY OF THE INVENTION

The object of the invention is a method of arranging the additional bits which ensures complete freedom in selecting the parameters and in using the service bits.

In general, the invention features a method for digital transmission of messages in the digital radio relay system using a superframe for digital signals to permit transmission of additional data, wherein m superframes are created such that each superframe has two half-frames containing one byte for additional bits, wherein the m superframes are combined in a multiple frame, and the digital signal of each superframe is scrambled by adding a periodic bit pattern to the digital signal.

In preferred embodiments of the method of digital transmission the byte of the first half-frame contains parity bits, service bits and frame alignment bits, and the byte of the second half-frame contans parity bits, service bits, one marking bit and one frame alignment bit; the frame alignment bit in the second byte is shifted by exactly one-half the length of the superframe with regard to one of the frame alignment bits in the first byte, wherein the frame alignment bit in the second byte has the opposite logical value of the frame alignment bit in the first byte; the marking bit in consecutive superframes of the multiple frame passes through the values of a periodic pattern of period m; the marking bit in the first superframe of a multiple frame has a logical value 1 and in the remaining superframes a logical value 0; and the multiple frame is utilized in the service bit for the transmission of up to a maximum of m service signals using time-devision multiplexing.

In this method simulations of the frame alignment signal occur within the period of the multiple frame while the true frame alignment has the period of the superframe.

The use of a frame alignment bit in the byte of the second half-frame, i.e., in the second byte, is advantageous for identifying the superframe when this method is used.

The special arrangement of this frame alignment signal allows simulation by the service bits in the second byte to be eliminated, so that the service bits can be used without restriction.

Other features and advantages of the invention will be apparent from the following detailed description, and from the claims.

For a full understanding of the present invention, reference should now be made to the following detailed description and to the accompanying drawings.

BRIEF DESCRIPTION OF THE DRAWINGS

The invention will now be described in more detail by referring to the single FIGURE which discloses an embodiment of the superframe.

DETAILED DESCRIPTION

Referring to the FIGURE, the arrangement of the additional bits in superframe 10 is shown. This superframe is $2^9$ or 512 bits long, and it contains two bytes 12 and 14, each with k=8 additional bits. Between each byte, 248 data bits are located.

Byte 12, which is the byte of the first half frame provided for the additional signals, contains one parity bit P1, one service bit D1 and six frame alignment bits which form the frame alignment word 110100. Byte 14 which is the bit of the second half frame of the superframe provided for the insertion of additional bytes, contains one parity bit P2, one marking bit M, one frame alignment bit with the logical value 0 and five service bits for the values D2 through D6. The frame alignment bit in byte 14 is located in position 3. It has the opposite logical value of the respective frame alignment bit in position 3 of byte 12. The service bits D2 through D6 can assume any value without resulting in simulation of the frame alignment bit.

A multiple frame is formed from eight consecutive superframes. In superframe 10 the marking bit has a logical value 1. In additional superframes 2 through 8 (not shown), the marking bit has the value 0. A feedback shift register, which is used as a generator for the scrambler sequence, is reset at the beginning of each superframe. The signal is scrambled by generating a periodic bit pattern which is synchronous to the superframe and added to the digital signal so that a scrambled signal is generated. The scrambled signal can then be unscrambled in the receiver by generating in the receiver and adding to the scrambled signal, the same scrambler sequence as used in the transmitter. In both the scrambling and unscrambling operations the addition is by binary addition.

This results in a scrambler sequence of the period $2^{12} = 4096$. The practical, time-division multiplex utilization of the service bits depends on the bit rate of the digital signal. If a digital signal of the fourth hierarchy level with a bit rate of $r_b = 139,264$ kbit/sec is involved, the superframe frequency of $f_u = r_b$ (512/496) (1/512) = 280.77 kHz. Therefore, a digital signal with a bit rate 280.77 kbit/sec can be transmitted in each service bit. A meaningful value for the bit rate of the digital service channels, however, is approximately 30 bit/sec. Using this bit rate, a service call can be transmitted using delta modulation. Therefore, it is practical to utilize the service bits in a time-division multiplex method and to transmitt 8 digital service signals with a bit rate of 35.10 kbit/sec for each service bit.

There has thus been shown and described a novel method for digital transmission of messages which fulfills all the objects and advantages sought. Many changes, modifications, variations and other uses and application of the subject invention will, however, become apparent to those skilled in the art after considering this specification which discloses embodiments thereof. All such changes, modifications, variations and other uses and applications which do not depart from the spirit and scope of the invention are deemed to be covered by the invention which is limited only by the claims which follow.

What is claimed is:

1. In a method for digital transmission of messages in a digital radio relay system using a superframe for digital signals to permit the transmission of additional bits of data, the improvement comprising the steps of:
   (a) creating a predetermined number m of superframes, wherein each superframe comprises two half-frames, each half-frame appearing in the superframe in equal, consecutive, predetermined time periods and each half frame containing one byte for additional bits of data;
   (b) combining the m superframes into a multiple frame; and
   (c) scrambling the digital signals, including the additional bits of data, of each superframe by adding a periodic bit pattern to the digital signals wherein the scrambling pattern has a period of the length of the multiple frame, wherein the byte of the first half frame contains at least one parity bit, one service bit and a plurality of frame alignment bits in a predetermined sequence, and the byte of the second half frame contains at least one parity bit, one marking bit, one frame alignment bit, and a plurality of service bits in a predetermined sequence.

2. The method according to claim 1, further comprising the step of shifting the frame alignment but in the second byte by exactly one half the length of the superframe with regard to one of the frame alignment bits in a first byte, wherein the frame alignment bit and the second byte has the opposite logical value of the frame alignment bit in the first byte.

3. The method accoring to claims 1 or 2, further comprising the step of passing the marking bit, in consecutive superframes of the multiple frame, through the values of a periodic pattern of period m.

4. The method according to claim 3, therein the marking bit in the first superframe of a multiple frame has a logical value 1 and in the remaining superframes the locigal value 0.

5. The method according to claims 1 or 2, further comprising the step of utilizing the service bit data in the multiple frame for the transmission of up to a maximum of m service signals using time-division multiplexing.

6. The method according to claim 3, further comprising the step of utilizing the service bit data in the multiple frame for the transmission of up to a maximum of m service signals using time-division multiplexing.

7. The method according to claim 4, further comprising the step of utilizing the service bit data in the multiple frame for the transmission of up to a maximum of m service signals using time-division multiplexing.

* * * * *